(12) United States Patent
Moshfeghi

(10) Patent No.: US 8,780,943 B2
(45) Date of Patent: Jul. 15, 2014

(54) METHOD AND SYSTEM FOR UTILIZING MULTIPLEXING TO INCREASE THROUGHPUT IN A NETWORK OF DISTRIBUTED TRANSCEIVERS WITH ARRAY PROCESSING

(75) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 0 days.

(21) Appl. No.: 13/473,180

(22) Filed: May 16, 2012

(65) Prior Publication Data

US 2013/0094522 A1 Apr. 18, 2013

Related U.S. Application Data

(60) Provisional application No. 61/548,201, filed on Oct. 17, 2011.

(51) Int. Cl.
*H04J 3/00* (2006.01)
*H04W 88/06* (2009.01)
*H04B 7/06* (2006.01)

(52) U.S. Cl.
CPC .............. *H04W 88/06* (2013.01); *Y02B 60/50* (2013.01); *H04B 7/0689* (2013.01)
USPC ........................................................ 370/498

(58) Field of Classification Search
USPC ................ 370/390, 343, 310, 313–314, 328, 370/332–333, 339; 455/73
See application file for complete search history.

(56) References Cited

U.S. PATENT DOCUMENTS

| | | | |
|---|---|---|---|
| 5,936,577 A * | 8/1999 | Shoki et al. ................... 342/373 |
| 6,718,159 B1 | 4/2004 | Sato | |
| 6,802,035 B2 | 10/2004 | Catreux et al. | |
| 7,248,217 B2 | 7/2007 | Mani et al. | |
| 7,260,141 B2 | 8/2007 | Bierly et al. | |

(Continued)

FOREIGN PATENT DOCUMENTS

| | | |
|---|---|---|
| WO | PCT/US2012/58839 | 1/2013 |
| WO | WO 2013/058998 | 4/2013 |
| WO | WO 2013/058999 | 4/2013 |

OTHER PUBLICATIONS

International Search Report and the Written Opinion of the International Searching Authority, or the Declaration, in International application No. PCT/US12/58842, dated Jan. 4, 2013. (11 pages).

(Continued)

*Primary Examiner* — Kwang B Yao
*Assistant Examiner* — Syed M Bokhari
(74) *Attorney, Agent, or Firm* — Adeli LLP

(57) ABSTRACT

A communication device that comprises a plurality of distributed transceivers, a central processor and a network management engine, may be configured for a multiplexing mode of operation. Configuring of the multiplexing mode of operation may include configuring one or more communication modules for multiplexing a plurality of data streams. Each of the communication modules may comprise one or more antennas and/or antenna array elements and one or more of said plurality of distributed transceivers associated with said one or more antennas and/or antenna array elements. The communication modules may be configured to be spatially distinct and/or to use different frequency channels. The data streams may be communicated to a single target device or to a plurality of target devices.

34 Claims, 9 Drawing Sheets

(56) References Cited

U.S. PATENT DOCUMENTS

| | | |
|---|---|---|
| 7,574,236 B1 | 8/2009 | Mansour |
| 7,688,909 B2 | 3/2010 | Tsutsui |
| 7,689,216 B2 | 3/2010 | Wandel |
| 7,890,114 B2 | 2/2011 | Braun et al. |
| 7,904,117 B2 | 3/2011 | Doan et al. |
| 8,098,752 B2 | 1/2012 | Hwang et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,203,978 B2 | 6/2012 | Walton et al. |
| 8,280,445 B2 | 10/2012 | Yong et al. |
| 8,320,304 B2 | 11/2012 | Deb et al. |
| 8,364,188 B2 | 1/2013 | Srinivasan et al. |
| 8,369,791 B2 | 2/2013 | Hafeez |
| 8,396,157 B2 | 3/2013 | Li et al. |
| 2003/0125040 A1 | 7/2003 | Walton et al. |
| 2004/0077354 A1 | 4/2004 | Jason et al. |
| 2004/0082356 A1 | 4/2004 | Walton et al. |
| 2004/0095907 A1 | 5/2004 | Agee et al. |
| 2005/0232216 A1* | 10/2005 | Webster et al. ............... 370/343 |
| 2007/0093270 A1 | 4/2007 | Lagnado |
| 2007/0116012 A1 | 5/2007 | Chang et al. |
| 2008/0166975 A1 | 7/2008 | Kim et al. |
| 2008/0212582 A1* | 9/2008 | Zwart et al. ................... 370/390 |
| 2008/0261509 A1 | 10/2008 | Sen |
| 2008/0305820 A1 | 12/2008 | Sadiq et al. |
| 2009/0156227 A1 | 6/2009 | Frerking et al. |
| 2010/0090898 A1 | 4/2010 | Gallagher et al. |
| 2010/0136922 A1* | 6/2010 | Rofougaran ..................... 455/73 |
| 2010/0304770 A1 | 12/2010 | Wietfeldt et al. |
| 2011/0002410 A1 | 1/2011 | Forenza et al. |
| 2011/0003610 A1 | 1/2011 | Key et al. |
| 2012/0083207 A1 | 4/2012 | Rofougaran et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0129543 A1 | 5/2012 | Patel et al. |
| 2012/0149300 A1 | 6/2012 | Forster |
| 2012/0184203 A1 | 7/2012 | Tulino et al. |
| 2012/0238202 A1 | 9/2012 | Kim et al. |
| 2013/0040558 A1 | 2/2013 | Kazmi |
| 2013/0094439 A1 | 4/2013 | Moshfeghi |
| 2013/0094440 A1 | 4/2013 | Moshfeghi |
| 2013/0094544 A1 | 4/2013 | Moshfeghi |
| 2013/0095747 A1 | 4/2013 | Moshfeghi |
| 2013/0095770 A1 | 4/2013 | Moshfeghi |
| 2013/0095874 A1 | 4/2013 | Moshfeghi |
| 2014/0044041 A1 | 2/2014 | Moshfeghi |
| 2014/0044042 A1 | 2/2014 | Moshfeghi |
| 2014/0044043 A1 | 2/2014 | Moshfeghi |
| 2014/0045478 A1 | 2/2014 | Moshfeghi |
| 2014/0045541 A1 | 2/2014 | Moshfeghi |

OTHER PUBLICATIONS

Portions of prosecution history of U.S. Appl. No. 13/473,083, Mar. 3, 2014, Moshfeghi, Mehran Portions of prosecution history of commonly owned U.S. Appl. No. 13/473,083, listed as item #39 above, including action(s) dated Mar. 3, 2014 (12 pages).

Portions of prosecution history of U.S. Appl. No. 13/473,096, Dec. 9, 2013, Moshfeghi, Mehran, Portions of prosecution history of commonly owned U.S. Appl. No. 13/473,096, listed as item #35 above, including action(s) dated Dec. 9, 2013 (11 pages).

Portions of prosecution history of U.S. Appl. No. 13/473,105, Nov. 25, 2013, Moshfeghi, Mehran, Portions of prosecution history of commonly owned U.S. Appl. No. 13/473,105, listed as item #36 above, including action(s) dated Nov. 25, 2013 (12 pages).

Portions of prosecution history of U.S. Appl. No. 13/473,160, Jan. 15, 2014, Moshfeghi, Mehran, Portions of prosecution history of commonly owned U.S. Appl. No. 13/473,160, listed as item #40 above, including action(s) dated Jan. 15, 2014 (18 pages).

Portions of prosecution history of U.S. Appl. No. 13/473,144, Feb. 6, 2014, Moshfeghi, Mehran, Portions of prosecution history of commonly owned U.S. Appl. No. 13/473,144, listed as item #38 above, including action(s) dated Feb. 6, 2014 (30 pages).

Portions of prosecution history of U.S. Appl. No. 13/473,096, Apr. 23, 2014, Moshfeghi, Mehran, Portions of prosecution history of commonly owned U.S. Appl. No. 13/473,096, listed as item #35 in the IDS filed on Mar. 20, 2014, including action(s) dated Apr. 23, 2014 and response(s)/ amendment(s) filed Apr. 9, 2014 (32 pages).

* cited by examiner

METHOD AND SYSTEM FOR UTILIZING MULTIPLEXING TO INCREASE THROUGHPUT IN A NETWORK OF DISTRIBUTED TRANSCEIVERS WITH ARRAY PROCESSING

CLAIM OF PRIORITY

This patent application makes reference to, claims priority to and claims benefit from U.S. Provisional Application Ser. No. 61/548,201 filed on Oct. 17, 2011.

The above stated application is hereby incorporated herein by reference in its entirety.

CROSS-REFERENCE TO RELATED APPLICATIONS/INCORPORATION BY REFERENCE

This application makes reference to:
U.S. application Ser. No. 13/473,096, filed on May 16, 2012, now published as U.S. Patent Publication 2013-0094439;
U.S. application Ser. No. 13/473,144, filed on May 16, 2012, now published as U.S. Patent Publication 2013-0095747;
U.S. application Ser. No. 13/473,105, filed on May 16, 2012, now published as U.S. Patent Publication 2013-0094440;
U.S. application Ser. No. 13/473,160, filed on May 16, 2012, now published as U.S. Patent Publication 2013-0095874;
U.S. application Ser. No. 13/473,113, filed on May 16, 2012, now published as U.S. Patent Publication 2013-0094544; and
U.S. application Ser. No. 13/473,083, filed on May 16, 2012, now published as U.S. Patent Publication 2013-0095770.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and a system for utilizing multiplexing to increase throughput in a network of distributed transceivers with array processing.

BACKGROUND OF THE INVENTION

Millimeter Wave (mmWave) devices are being utilized for high throughput wireless communications at very high carrier frequencies. There are several standards bodies such as 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as, for example, data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing multiplexing to increase throughput in a network of distributed transceivers with array processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing multiplexing to increase throughput in a network of distributed transceivers with array processing. In various embodiments of the invention, a communication device that comprises a plurality of distributed transceivers, a central processor and a network management engine may be configured for a multiplexing mode of operation. In this regard, configuring the communication device for a multiplexing mode of operation may comprise configuring one or more communication modules (or blocks), from one or more of the plurality of distributed transceivers and/or antennas (or antenna arrays) associated with the distributed transceivers, based on the multiplexing mode, and multiplexing communication of a plurality of data streams via the one or more communication modules. Each of the communication modules may comprise, for example, one or more antennas or antenna array elements, and one or more of the plurality of distributed transceivers associated with the one or more antennas or antenna array elements—e.g., distributed transceivers controlling the antennas operations and providing RF related processing of signals received or transmitted via the antenna(s) or antenna array element(s). At least some of the data streams may be communicated to a single destination device. In some instances, at least some of the one or more communication modules may be configured to have distinct spatial communication profiles. In this regard, creating the distinct spatial communication profiles may comprise configuring particular and/or distinct beamforming settings and/or antenna arrangement for each of the communication modules. In some instances, at least some of the one or more communication modules may be configured to have distinct frequency or channel.

The communication device may monitor a plurality of communication related parameters or conditions that are associated with and/or that may affect the configuration and/or use of the communication modules. In this regard, the communication related parameters and/or conditions may pertain to link quality and/or propagation environment. The communication device may then configure the multiplexing mode of operation based on the communication related information. Furthermore, the communication device may determine and/or select connection types and/or communication protocols, which are used for establishing one or more links via the communication modules, for communicating the data streams. The selection of the connection types and/or communication protocols may be based on monitored and/or collected communication related information. The communication device may allocate communication resources to the plurality of communication modules for use during the communication of the data streams. At least some of the allocated resources may be shared among the plurality of communication modules.

Figure 1:
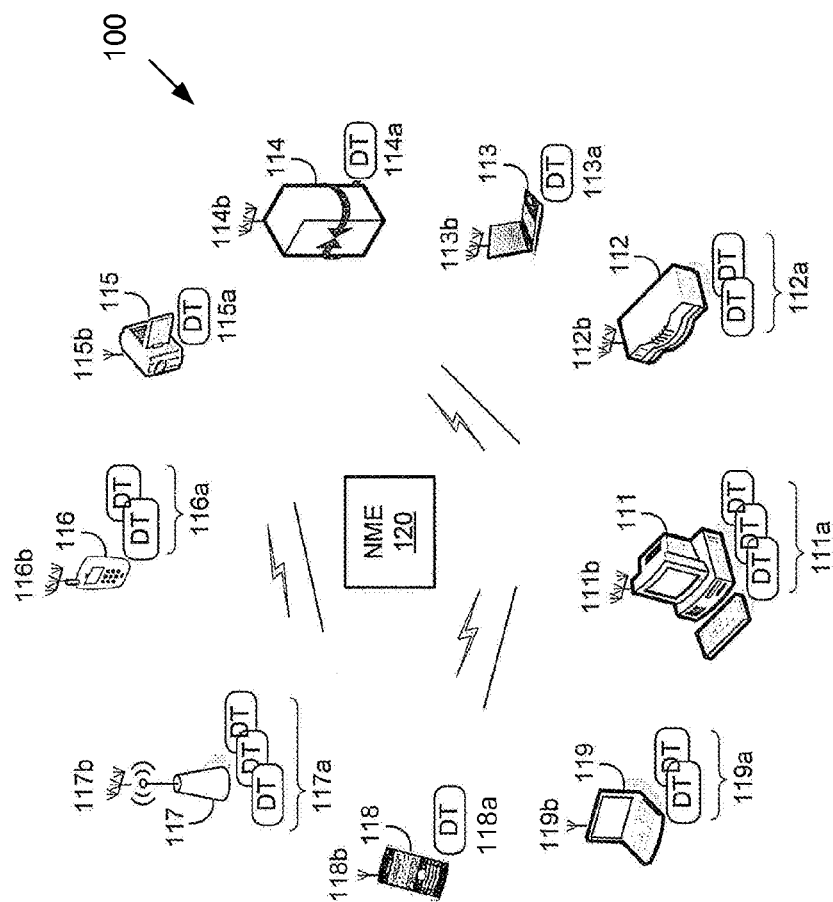
FIG. 1 is a block diagram illustrating an exemplary communication system that supports use and central management of distributed transceivers, in accordance with an embodiment of the invention.

FIG. 1 is a block diagram illustrating an exemplary communication system that supports use and central management of distributed transceivers, in accordance with an embodiment of the invention. Referring to FIG. 1, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111, for example, may comprise radios such as a millimeter Wave (mmWave), a WLAN, WiMAX, Bluetooth, Bluetooth Low Energy (BLE), cellular radios, WiMAX radio, or other types of radios. In this regard, radios such as mmWave radios may be utilized at very high carrier frequencies for high throughput wireless communications.

In operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate network microprocessor, for example. In an exemplary embodiment of the invention, an application device in the communication network 100 may act or function as a master application device or an end-user application device. An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as images, video, voice, as well as any other form of data to one or more receiving devices such as the end-user application devices 112-116, the network management engine 120 in the master application device 111 may be enabled to monitor and collect corresponding communication environment information from the end-user application devices 112-116. The collected communication environment information may comprise propagation environment conditions, link quality, device capabilities, antenna polarization, radiation pattern, antenna spacing, array geometry, device locations, target throughput, and/or application QoS requirements reported. The network management engine 120 may be operable to dynamically configure the distributed transceivers 111a-116a and associated antenna or antenna array 111b-116b, and to coordinate and manage the operation of the distributed transceivers 111a-116a and associated antenna or antenna array 111b-116b based on the collected communication environment information supplied from the end-user application devices 112-116. In this regard, the network management engine 120 may configure a single application device such as the application device 117 to maintain continuous connection with multiple different application devices such as the application devices 111-113.

The application device capabilities may comprise battery life, number of transceivers, number of antennas per transceiver, device interface types, processing protocols, service types, service classes and/or service requirements. The interface types for the application devices 111-119 may comprise access interface types such as Multimedia over Coax Alliance (MoCA), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Socket Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCA), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers without departing from the spirit and scope of various embodiments of the invention.

In an exemplary aspect of the invention, the application devices 111-119 may support one or more multiplexing modes of operations, which may be utilized to enhance communications among the devices (e.g., increase throughput). In this regard, during a multiplexing mode of operation, the distributed transceivers of the application devices 111-119 may be configured to support communication of multiple data streams by each of these devices, by multiplexing these multiple data streams over the devices' distributed transceivers. For example, multiple distributed transceivers, and/or antennas or antenna array elements associated therewith, may be configured with distinct communication profiles and/or characteristics, such that communicating via each of these transceivers (or antennas) may not affect remaining transceivers, thus allowing for concurrent and/or independent communicating by these remaining transceivers. In this regard, the transceiver may be configured to have distinct spatial communication profile (e.g., forming beams with unique and/or particular directionality) and/or to establish distinct communication links (e.g., distinct communication protocol, connection type, and/or frequency or frequency channel), which may not interfere with communication links established by any of the remaining transceivers.

During a multiplexing mode of operation, determining and/or configuring various settings associated with the selected multiplexing mode may be done based on communication environment information, which may be collected by the network management engine 120.

Figure 2:
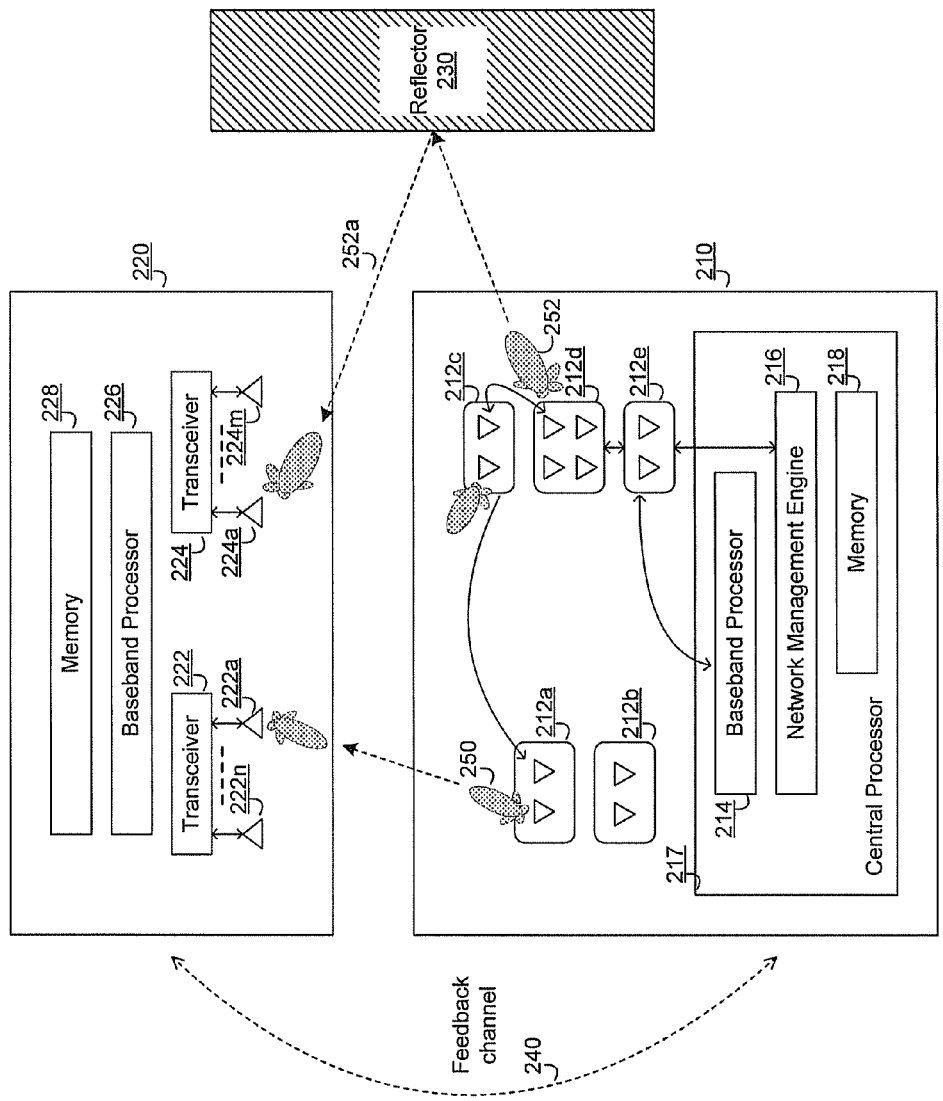
FIG. 2 is a diagram that illustrates an exemplary usage scenario where distributed transceivers are centrally managed to create a high-performance link between a transmitting device and one receiving device, in accordance with an embodiment of the invention.

FIG. 2 is a diagram that illustrates an exemplary usage scenario where distributed transceivers are centrally managed to create a high-performance link between a transmitting device and one receiving device, in accordance with an embodiment of the invention. Referring to FIG. 2, there is shown a master application device 210 and an end-user application device 220.

The master application device 210 may comprise suitable logic, circuitry, interfaces and/or code that may be operable to communicate multimedia information such as images, video, voice, as well as any other forms of data with one or more application devices such as the end-user application device 220. The master application device 210 may comprise a collection of distributed transceivers 212a through 212e, and a central processor 217 that comprises a central baseband processor 214, a network management engine 216 and a memory 218. In an exemplary embodiment of the invention, each of the collection of distributed transceivers 212a through 212e may be physically positioned and oriented at different locations within an application device such as a laptop, TV, gateway, and set-top box. In this regard, the collection of distributed transceivers 212a through 212e may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212a-212e may be oriented in a fixed direction or multiple different directions. In another exemplary embodiment of the invention, the collection of distributed transceivers 212a-212e may be operable to receive and/or transmit radio frequency signals from and/or to the end-user application device 220 using air interface protocols specified in UMTS, GSM, LTE, WLAN (e.g., IEEE 802.11a/b/g/n/ac), 60 GHz/mmWave (e.g., WiGig, IEEE 802.11ad), and/or WiMAX, for example. In some embodiments of the invention, active distributed transceivers may each operate at different RF carrier frequencies and/or using different air interface protocols. For example, transceiver 212a may be operating at 5 GHz carrier RF frequency using IEEE 802.11ac air protocol, while transceiver 212b may be concurrently operating at 60 GHz carrier RF frequency using IEEE 802.11ad air protocol.

The end-user application device 220 may comprise suitable logic, circuitry, interfaces and/or code that may enable communication with other devices, such as the master application device 210. In this regard, the end-user application device 220 may be substantially similar to the master application device 210. For example, the end-user application device 220 may comprise transceivers 222 and 224, utilizing antennas (or antenna arrays) 222a-222n and 224a-224m, respectively, a baseband processor 226, and a memory 228.

The central baseband processor 214 may comprise suitable logic, circuitry, interfaces and/or code that may be operable to perform baseband digital signal processing needed for transmission and receiving operation of the entire collection of distributed transceivers 212a through 212e. For example, the central baseband processor 214 may be operable to perform waveform generation, equalization, and/or packet processing associated with the operation of the collection of distributed transceivers 212a through 212e. In addition, the central baseband processor 214 may be operable to configure, manage and control orientations of the distributed transceivers 212a-212e. The baseband processor 226 may be substantially similar to the central baseband processor 214.

The network management engine 216 may comprise suitable logic, circuitry, interfaces and/or code that may be operable to monitor and collect communication environment information such as propagation environment conditions, reflectors in the environment and their positions, link quality, application device capabilities, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as the number of transceivers that are activated, the number of application devices that are being communicated with, transmit power levels per distributed transceiver and per antennas within a transceiver, adding/dropping application devices to the communication network 100. As shown in FIG. 2, the network management engine 216 is residing in the master application device 210. However, in some embodiments the network management engine 216 may reside on different network devices such as separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors for parallel baseband processing in order to increase throughput if needed.

The memory 218 may comprise suitable logic, circuitry, interfaces and/or code that may be operable to store information such as executable instructions and data that may be utilized by the central baseband processor 214 and/or other associated component units such as, for example, the network management engine 216. The memory 218 may comprise RAM, ROM, low latency nonvolatile memory such as flash memory and/or other suitable electronic data storage. The memory 228 may be substantially similar to the memory 218.

In an exemplary operation, a wireless link may be established between the master application device 210 and the end-user application device 220 through a reflector 230. In an exemplary embodiment of the invention, the master application device 210 may be operable to continuously scan the propagation environment to identify the directions and antenna patterns that result in strong reflected signals at the end-user application device 220. Then, the master application device 210 may associate each strong reflector with one of the collection of distributed transceivers 212a through 212e so as to transmit an independent different data stream to the end-user application device 220 over each distributed transceiver and through each strong reflector. For example, the master application device 210 transmits two data streams to the end-user application device 220 using two different distributed transceivers 212a and 212d that may use the same frequency channel. In particular, the distributed transceivers 212a may choose a beam pattern 250 and orientation for a direct LOS to a transceiver 222, for example, of the end-user application device 220 (the receiving device) and transmit a first data stream over a carrier frequency $RF_1$. On the other hand, the distributed transceivers 212d may choose a beam pattern 252 and orientation that is pointing towards the reflector 230 and transmit a second data stream also over the same carrier frequency $RF_1$. The reflector 230 then may reflect the beam 252 towards a different transceiver 224 of the end-user application device 220. The selection of beam patterns 250 and 252 may be constrained such that the cross-interference at receivers 222 and 224 may be minimized or reduced below a programmable threshold. Iterative and/or adaptive steps may be used to fine-tune the patterns 250 and 252, such as based on feedback from measured cross-interference at receivers 222 and 224. The selection of the beam patterns 250 and 252 may come from the central baseband processor 214 and the network management engine 216. In an exemplary embodiment of the invention, the central baseband processor 214 may profile channel energy for directions of arrival and other schemes. The network management engine 216 may know communication environment information such as the number of users, number of streams needed, and/or available frequency channels. For example, the central baseband processor 214 and the network management engine 216 may select narrow beams for close devices and may select wide beams for further devices, respectively.

In one embodiment of the invention, the master application device 210 may be operable to utilize the reflector 230 for the second data stream, for example, to lower the chances of an object blocking both the first and second data streams, simultaneously. In other words, if a big enough object blocks the LOS between the master application device 210 and the end-user application device 220, the second data stream may likely be intact and sustained by complete direct reflecting through a reflected path 252a. Although FIG. 2 shows one reflector 230, in one embodiment of the invention, several reflectors may be used to transmit one data stream or multiple data streams. The use of multiple reflectors may provide reflection diversification in case one reflector or a sub-set of reflectors are blocked. In other words, instead of directing all transmit power towards one reflector only, the total transmit power may be distributed to propagate over a set of "good" reflectors in the environment. This distribution of power over different reflectors may be done in a controlled, configurable, adaptive, and intelligent manner. For example, reflectors may be chosen and targeted that provide better orthogonality and/or independence between the different paths.

In FIG. 2, the master application device 210 may use a second reflector at a different location and another distributed transceiver 212c, for example, to communicate with the end-user application device 220 and send a third data stream. Also the reflected path 252a may be caused by more than one reflector where, for example, the distributed transceiver 212e transmits towards the reflector 230 and the reflection transmits towards a second reflector and the reflection of the second reflector reaches the end-user application device 220. In another embodiment of the invention, the first and second data streams in FIG. 2 may comprise the same data content and the use of LOS path and one or more reflector paths may provide link robustness for data content in case an obstacle blocks some of the paths.

The master application device 210 may continuously monitor and collect propagation environment conditions, link quality, device capabilities, locations, target throughput, and/or application QoS requirements reported from the end-user application device 220. In this regard, a feedback or negotiation channel 240 may be utilized to exchange and negotiate system configurations such as number of transceivers within devices, number of antennas per transceivers, the measured channel responses, the sequence of antenna array coefficients being evaluated, and/or device location. The feedback or negotiation channel 240 may be implemented through a WLAN (e.g., Wi-Fi 802.11* link), Bluetooth link (over 2.4 GHz band), and/or 60 GHz link, for example In some embodiments of the invention, the master application device 210 and/or the (slave) end-user application device 220 may deploy a plurality of baseband processors for implementing data processing requirements and/or demands. For example, multiple baseband processors may be deployed to generate and/or decode different data streams that may be transmitted or received by several distributed transceivers. In such configuration, the NME (e.g., NME 216) may be used to enable controlling and/or coordinating operation of the multiple baseband processors. In this regard, several internal connection topologies may be used. In some embodiments of the invention, each baseband processor may be dedicated and/or assigned to a subset of distributed transceivers available in the system, and for each baseband processor, ring and/or star topologies (explained later) may be used in interacting with corresponding transceiver(s). In this regard, there may be no data transfer between the subsets. In another embodiment, however, all baseband processors and transceivers (within a device) may be connected together through a ring topology (single cable). In such scenario, the baseband processors may coordinate sharing the single cable, such as based on time-multiplexing (same IF frequency) or frequency-multiplexing (different IF frequencies). The baseband processors may have different power, processing, and/or communication characteristics. Accordingly, in some embodiments of the invention, the baseband processor that is most suitable for a particular mode of operation (e.g., lower power consumption meeting the throughput requirement) may be selected and activated, with the other baseband processors remaining inactive and/or getting disabled.

Figure 3:
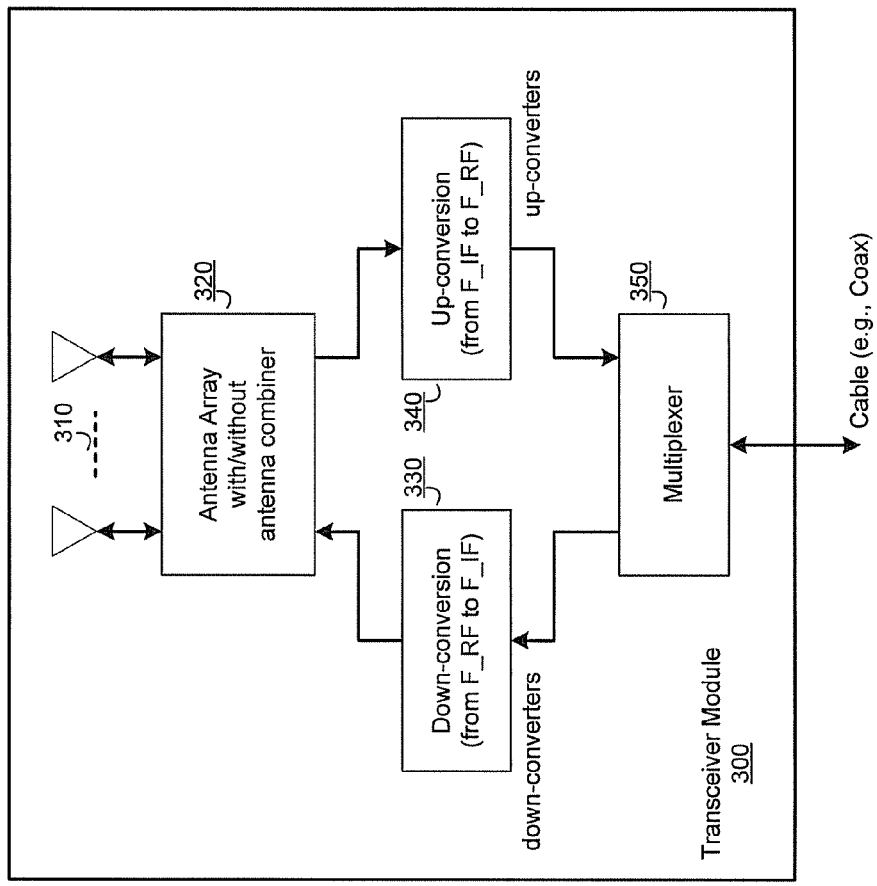
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For transmission the transceiver 300 may be operable to receive a transmit signal from the central baseband processor 214. The transmit signal received from the central baseband processor 214 may be up-converted to RF frequency via the up-converters 340. For reception, the transceiver 300 may pass a receive signal from the antenna array 310 after down-conversion to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission. In some embodiments of the invention, the transceiver module in FIG. 3 may not contain the up-conversion and/or down-conversion sub-blocks 330 and 340. In such cases, no frequency translation may be performed, and RF and IF frequencies may be identical.

Figure 4:
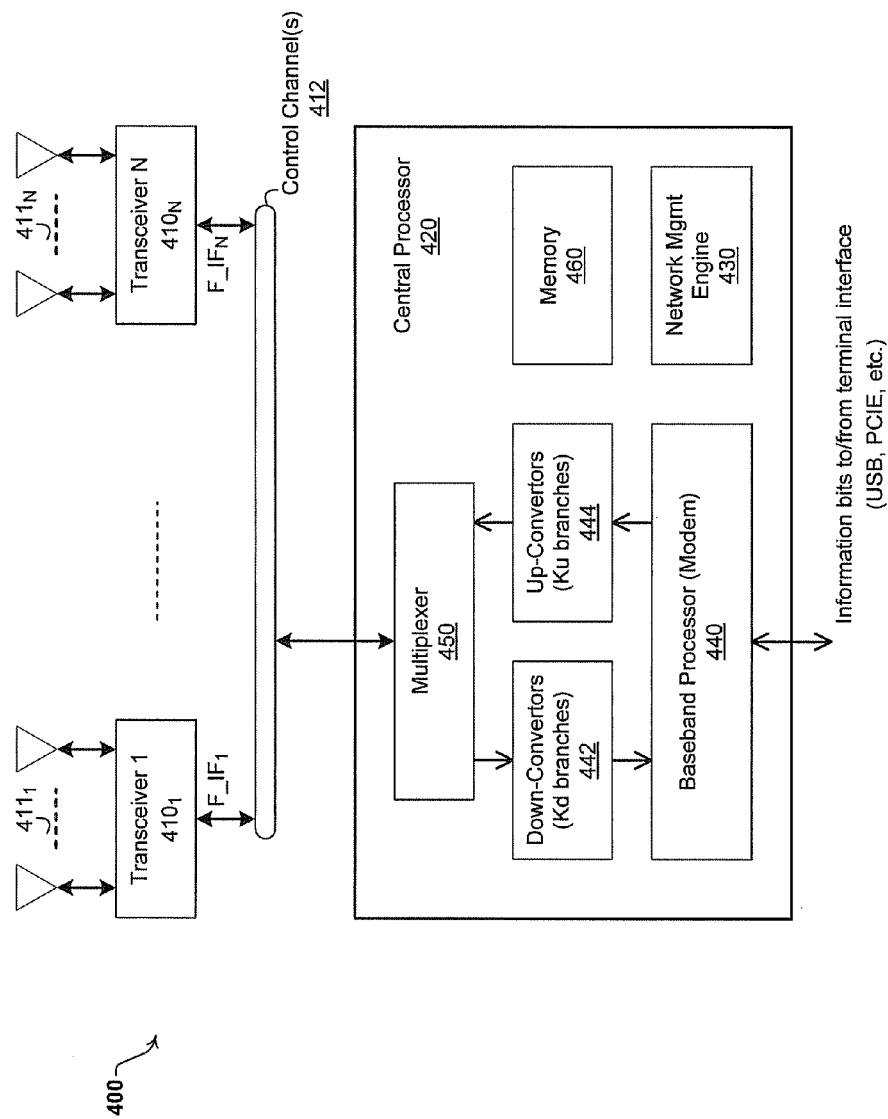
FIG. 4 is a diagram illustrating an exemplary application device with a collection of distributed transceivers, in accordance with an embodiment of the invention.

FIG. 4 is a diagram illustrating an exemplary application device with a collection of distributed transceivers, in accordance with an embodiment of the invention. Referring to FIG. 4, there is shown an application device 400, which may comprise a central processor 420 that is connected to a collection of distributed transceivers $410_1$-$410_N$.

The distributed transceivers $410_1$-$410_N$ and the central processor 420 may be connected using different topologies. For example, the distributed transceivers $410_1$-$410_N$ may be connected to the central processor 420 using star topology, whereby direct separate cables may be used, for example, to connect the central processor 420 to each of the collection of transceivers $410_1$-$410_N$. Alternatively, a ring topology may be utilized, whereby a single movable cable or connector, for example, may be used to connect the central processor 420 to any particular one of the distributed transceivers $410_1$-$410_N$ at any given point. In other words, the central processor 420 may connect to one of the distributed transceivers $410_1$-$410_N$, and that connection may then be moved to a different transceiver when needed. One or more control channels (e.g., multiplexed over the same cable) between the central processer 420 and the distributed transceivers $410_1$-$410_N$ may be utilized for configuring and managing corresponding transceivers. The number and/or structure of the control channels may differ based on the connectivity topology. For example, with star topology, a plurality of control channels $412_1$-$412_N$ may be used to connect the central processer 420 to each of the distributed transceivers $410_1$-$410_N$, and may be utilized for configuring and managing the transceivers $410_1$-$410_N$, respectively (e.g., assigning different addresses to each transceiver, for configuration of READ/WRITE commands). In ring topology, a single control channel 412 may be used, and may be utilized to connect the central processer 420 to each particular distributed transceiver $410_x$ at any given point, to enable configuring and managing that transceiver. In both topologies, the same cables may be used for routing power supply to the distributed transceivers $410_1$-$410_N$.

While the interface between the central processor 420 and the distributed transceivers $410_1$-$410_N$ may be described as utilizing cable (i.e., the central processor 420 being connected to the distributed transceivers $410_1$-$410_N$ via one or more cables), the invention may not be so limited. Accordingly, in some embodiments of the invention, the cable connection between the central baseband processor and the distributed transceivers may be substituted with an optical connection, printed-board connection, Ethernet cable, or another wireless connection.

The central processor 420 comprises a baseband processor 440, a network management engine 430, down-converters 442, up-converters 444, a multiplexer 450 and a memory 460. The baseband processor 440 may comprise suitable logic, circuitry, interfaces and/or code that may be operable to provide MODEM functionality. In this regard, the central processor 420 may be operable to perform various baseband digital processing such as MIMO, OFDM, CDMA, frequency-hopping, channel coding, HARQ, channel estimation and equalization, Timing/Carrier recovery and synchronization. The network management engine 430 may operate in substantially the same manner as the network management engine 218 in FIG. 2. During transmission, a baseband signal supplied from the baseband processor 440 may be translated into an intermediate-frequency (IF) signal. The up-converters 444 may further translate the IF signal to a final radio-frequency (RF) and send it over the air through an antenna array such as the antenna array $411_1$. For reception, the transceiver $410_1$, for example, may pass a received RF signal from the antenna array $411_1$ to the down-converters 442. The down-converters 442 may translate the RF signal into an IF signal. The IF signal may further be translated to a baseband signal to the baseband processor 440, for example. The multiplexer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 440 and/or other associated component units such as, for example, the network management engine 430. The memory 360 may comprise RAM, ROM, low latency nonvolatile memory such as flash memory and/or other suitable electronic data storage.

In some embodiments of the invention, the interface between the central processor 420 and the distributed transceivers $410_1$-$410_N$ may also be configured to allow for supporting the transceivers $410_1$-$410_N$ having digital processing and mixed-signal capability—i.e., to allow for interactions based on non-analog IF connections. For example, the transceivers $410_1$-$410_N$ may comprise analog-to-digital-converters (ADCs) and digital-to-analog-converters (DACs). In such scenario, a transceiver $410_x$ may receive digital bits from the central processor 420 (through a digital link), after processing via the baseband processor 440 for example, and may use its internal DAC to generate the analog waveform and then perform the frequency up-conversion and beamforming steps. Similarly, a transceiver $410_x$ may receive an RF waveform, down-convert it, and then use its internal ADC to digitize the waveform and send the digital bits over a digital connection/cable to the centralized processor 420 (where it may be further processed via the baseband processor 440, for example). In other embodiments of the invention, the transceivers $410_1$-$410_N$ may comprise more digital processing blocks, in addition to ADC/DAC blocks. In such scenario, a portion of processing within the central processor 420 may be moved (e.g., in terms of partitioning) to the transceivers $410_1$-$410_N$. In the above embodiments of the invention—i.e., when there may be need for digital based interfacing between the central processor and the transceivers—digital connections and/or interfaces such as Ethernet and various memory bus protocols may be deployed.

The distributed transceivers $410_1$-$410_N$ may operate in various modes such as spatial diversity mode, frequency diversity mode, multiplexing mode, multiple-input-multiple-output (MIMO) mode, and/or relay mode. Furthermore, in some embodiments, the distributed transceivers $410_1$-$410_N$ may be configured to switch between spatial diversity mode, frequency diversity mode, multiplexing mode, multiple-input-multiple-output (MIMO) mode, and/or relay mode based on corresponding propagation environment conditions, link quality, device capabilities, device locations, usage of resources, resource availability, target throughput, application QoS requirements.

In spatial diversity mode, the central processor 420 may be operable to utilize the distributed transceivers $410_1$-$410_N$ to establish a spatial diversity link with intended end user device such as the end-user application device 220. For example, only a portion of the distributed transceivers $410_1$-$410_N$ that may have strong propagation channel responses are activated and other transceivers are switched off for power saving. In another example, the distributed transceivers $410_1$-$410_N$ may be arranged such that the master application device 210 (the transmitter) with available LOS towards the end-user device 220 (the receiver) may be configured to directly beam towards the receiver. In an exemplary embodiment of the invention, each active distributed transceiver may communicate data streams utilizing the same final carrier frequency. In frequency diversity mode, the central processor 420 may manage the distributed transceivers $410_1$-$410_N$ similar to spatial diversity mode except that each active distributed transceiver may utilize a different final carrier frequency if such frequency spectrum channel is available. In some embodiments, different final carrier frequencies may be utilized for minimizing cross-interference, which may be present when operating in the same carrier frequency, and/or for exploiting additional diversity in the frequency domain. In some embodiments, the central processor 420 may also be operable to configure the distributed transceivers $410_1$-$410_N$ in accordance with a polarization diversity mode. In this regard, the central processor 420 may to configure the distributed transceivers $410_1$-$410_N$ such that to establish, a plurality of modules and/or links with intended end user devices, having varying antenna polarization. For example, the central processor 420 may configure the antennas and/or antenna arrays (or subsets thereof) of each of the distributed transceivers $410_1$-$410_N$ with different antenna polarizations for to achieve antenna polarization diversification. In this regard, antenna polarization refers to the orientation of the electric field of the radio wave transmitted (or may be received) by an antenna. Accordingly, applying varying antenna polarization to each of the each of the distributed transceivers $410_1$-$410_N$ may enable receiving and/or transmitting signals by different distributed transceivers, each with a different polarization, and thus may reduce the interference—i.e., signals transmitted, by a particular antenna (or group of antennas) configured at antenna polarization P1, would not be received by a second antenna configured at different polarization P2, and as such would not interfere with signals reception at the second antenna.

In relay mode, the central processor 420 may manage the distributed transceivers $410_1$-$410_N$ to support relay mode of operation, whereby the application device 400 may be utilized in relaying data streams between two other devices. In this regard, the star topology implementation may particularly be suited for relay operations, enabling reception of input data stream from a first device, via a first set of the distributed transceivers $410_1$-$410_N$, and (re)transmission of the received data stream to a second device via a second set of the distributed transceivers $410_1$-$410_N$. The selection of the first and second sets of the distributed transceivers $410_1$-$410_N$, and the configuration thereof may be performed adaptively and/or dynamically. In this regard, the transceivers utilized in receiving and/or transmitting the relayed streams may be select such that to optimize the relaying operation performed. This may comprise, for example, selecting and/or configuring the transceivers such that radio frequencies and/or channels may be reused efficiently. For example, use of beamforming may enable mitigating potential interference between incoming and outgoing signals as to allow using the same radio frequency (RF). In other words, the same RF channel/spectrum may be reused in manner that may allow for maintaining links with the two end devices utilizing physically separated transceivers that may use non-overlapping antenna patterns to minimize interference. Furthermore, the transceiver(s) maybe be configured as to use only some of the antennas available therein (e.g., subset of the antenna array), and/or may allow for use of transceivers without array processing.

In multiplexing mode, the central processor 420 may manage the distributed transceivers 410$_1$-410$_N$ in such a way that different streams of data may be transmitted through different sets of the distributed transceivers 410$_1$-410$_N$. For example, in multiplexing mode, different distributed transceivers of the distributed transceivers 410$_1$-410$_N$ may be dynamically programmed such that each transceiver's maximum pattern gain may be pointing to a different direction or reflector. As the environment changes (and hence location of reflectors and end user unit change), the antenna pattern of the distributed transceivers 410$_1$-410$_N$ may be re-adjusted. In MIMO mode, the central processor 420 may manage the distributed transceivers 410$_1$-410$_N$ in such a way that different streams of data may be transmitted through different sets of the distributed transceivers 410$_1$-410$_N$ to a single receiver device such as the end-user application device 220.

In various embodiments of the invention, a multiplexing mode of operation may be configured and/or applied to allow establishing (and using) different and/or distinct communication links, which may enable multiplexing a plurality of data streams onto the distributed transceivers 410$_1$-410$_N$ (and/or the antennas) of the application device 400. Each data stream may require and/or provide different QoS, latency, bit-error-rate (BER), data rate, constellation, channel coding scheme, and/or modulation. In this regard, during a multiplexing mode of operation, the distributed transceivers 410$_1$-410$_N$ may be configured such that a plurality of data streams may be multiplexed over the distributed transceivers 410$_1$-410$_N$, with these data streams being directed to, for example, different target end-user application devices. In other instances, at least some of the data streams multiplexed over the distributed transceivers 410$_1$-410$_N$ may be directed to the same target end-user application device. To guard against unintended interference among the data streams—e.g., residual cross-interference among the streams—a multiplexing mode of operation may be configured to mitigate such interference. For example, during a multiplexing mode of operation, the distributed transceivers 410$_1$-410$_N$ may be configured such that each transceiver module may exhibit distinct spatial communication characteristics, to ensure that signals communicated via each transceiver may not interfere with signals communicated to and/or from other transceiver modules. The transceivers may also be configured to establish distinct communication links that may not interfere with links established by other transceivers. This may be achieved by utilizing distinct communication protocols (e.g., WiFi vs. WiMAX) and/or connection types. This may also be achieved by simply assigning different and sufficiently distinct frequencies and/or frequency channels to the transceivers, with these frequencies or frequency channels being selected in a manner that ensure that communications by these transceiver modules would cause cross-interference.

While a multiplexing mode of operation may be described with respect to individual transceivers (e.g., each of the distributed transceivers 410$_1$-410$_N$), the invention need not be so limited. Accordingly, in some embodiments of the invention, a multiplexing mode of operation may comprise adaptive configuration of communication modules, based on grouping of antennas, which may comprise some of all of antennas (or antenna elements) of a single transceiver (e.g., grouping of only some of the antennas of the distributed transceiver 410$_1$), or may comprise antennas (or antenna elements) of more than one transceiver (e.g., grouping of all of the antennas of the distributed transceiver 410$_1$ and some of the antennas of the distributed transceiver 410$_N$). In this regard, rather than configuring individual transceivers, configuring a device such as the application device 400 in a multiplexing mode of operation may comprise dynamic configuration of communication modules which may adaptively combine particular antenna(s) or antenna array element(s) in the application device 400, along with one or more transceivers (e.g., transceivers associated with the selected antennas or antenna array elements), with each of the communication modules being configured separately and/or adaptively in accordance with the application multiplexing mode of operation.

In some embodiments of the invention, during a multiplexing mode of operation—i.e., when multiple communication links are established—different data streams with different security type/level or different priority or different traffic may be communicated over different communication links between two devices. Also, multiplexing may be utilized to further enhance security during communication. For example, when content is encrypted during communication between the devices, the content may be communicated over a first wireless link between the devices while the encryption key for that content is sent over a different link. In some instance, the encryption key may be sent over control channel(s)—e.g., the feedback or negotiation channel 240.

Figure 5A:
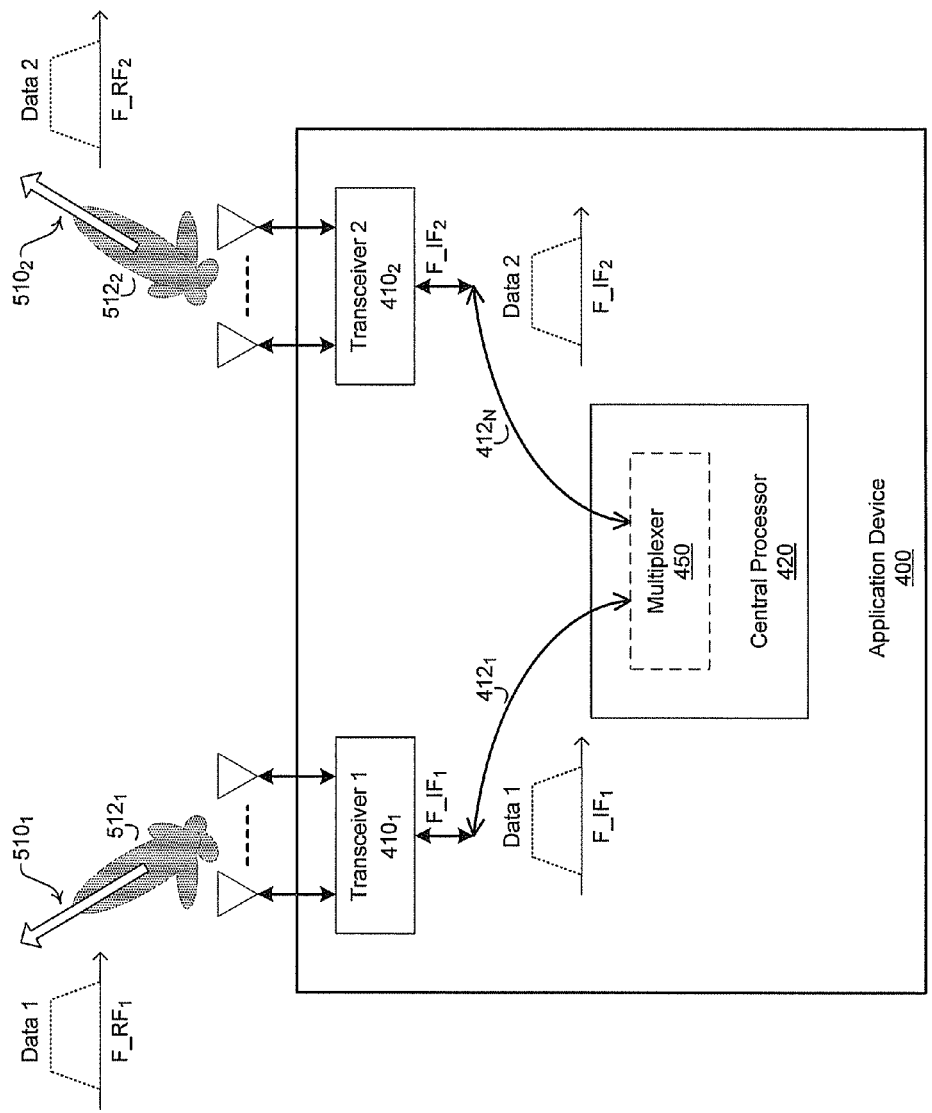
FIG. 5A is a diagram illustrating exemplary use of multiplexing during communication of multiple data streams by an application device with a collection of distributed transceivers that are implemented in a star topology, in accordance with an embodiment of the invention.

FIG. 5A is a diagram illustrating exemplary use of multiplexing during communication of multiple data streams by an application device with a collection of distributed transceivers that are implemented in a star topology, in accordance with an embodiment of the invention. Referring to FIG. 5A, there is shown the application device 400 of FIG. 4.

The application device 400 may be configured into a multiplexing mode of operation. In this regard, during the multiplexing mode of operation, the distributed transceivers 410$_1$-410$_N$ of the application device 400 may be configured to support communication of multiple streams from and/or to the application device 400. The distributed transceivers 410$_1$-410$_N$ may be connected to the central processor 420 in a star topology, using corresponding dedicated connections 412$_1$-412$_N$ that connect the central processor 420 to each of the distributed transceivers 410$_1$-410$_N$. Accordingly, the central processor 420 may be configured to provide the data streams, at the same times, to each of the distributed transceivers 410$_1$-410$_N$ being utilized for multiplexed communication.

During the multiplexing mode of operation, the central processor 420 may handle a plurality of data streams communicated to and/or from the application device 400. The baseband processor 440, the up-converters 444, and the down-converters 442 may be operable to perform the necessary processing and/or conversion between actual data (i.e., information bits), intermediate frequency (IF) waveforms, and communicated carrier RF streams. Furthermore the multiplexer 450 may be utilized for handling, based on the topology of the application device 400, communication of IF waveforms to and/or from the distributed transceivers 410$_1$-410$_N$. Since dedicated connections with the distributed transceivers 410$_1$-410$_N$ are available in a star topology implementation, the multiplexer 450 may implement frequency-division multiplexing—i.e., using different intermediate frequency (IF) waveforms—when forwarding the data streams targeted for transmission to the intended transceivers. For example, the central processor 420 may receive two streams of data for transmittal (Data 1 and Data 2), and may generate, based on processing via the baseband processor 440 and up-converters 444, two corresponding $F\_IF_1$ and $F\_IF_2$ waveforms each carrying a different one of the data streams (Data 1 and Data 2, respectively). The $F\_IF_1$ and $F\_IF_2$ waveforms may then be communicated to selected transceivers (e.g., transceivers 410$_1$ and 410$_2$) for transmission. In this regard, the $F\_IF_1$ and $F\_IF_2$ waveforms may be communicated concurrently to the transceivers 410$_1$ and 410$_2$, using corresponding dedicated connections 412$_1$ and 412$_2$. The transceivers 410$_1$ and 410$_2$ may then communicate the data streams Data 1 and Data 2 using corresponding carrier RFs (channels) $F\_RF_1$ and $F\_RF_2$.

In some embodiments of the invention, during a multiplexing mode of operation, the distributed transceivers 410$_1$-410$_N$ used in communicating the multiple data streams may be configured to use the same frequency channels. In the previous example, carriers $F\_RF_1$ and $F\_RF_2$, utilized by the transceivers 410$_1$ and 410$_2$ to communicate the data streams Data 1 and Data 2, may actually be the same frequency channels. In other embodiments of the invention, different carrier frequencies or frequency channels may be utilized during a multiplexing mode of operation, such as when additional frequencies and/or frequency channels may be available. For example, data streams Data 1 and Data 2, which may be transmitted over different frequency channels—i.e., $F\_RF_1$ and $F\_RF_2$ are different, and this may result in elimination of unacceptable residual cross-interference between the two streams. In this regard, when different RF frequencies are used, the RF assignments may follow a hopping pattern, which may be based on a determined and/or negotiated pattern. In this mode, $F\_RF_1$ follows a hopping pattern where the values are selected from a set of RF carriers (similarly for $F\_RF_2$). The frequency hopping may be used among the transceivers (of the same device) and/or among the different devices. In other embodiments, however, instead of using a fixed antenna pattern by a transceiver over a period of time, the antenna pattern may be switched (e.g., slow or fast rate of switching/hopping) between a set of antenna pattern candidates. For example, the NME (430) may decide that three antenna patterns may be suitable for a transceiver module. Instead of choosing only one of these candidates, the NME (430) may utilize this antenna pattern hopping mode for achieving diversity over all three "good" antenna pattern candidates.

During a multiplexing mode of operation, at least some of the transceivers used in communicating data streams may be configured to have a particular spatial and/or directional profile, which may mitigate cross-interference between the communicated data streams. This may be particularly useful when utilizing the same carrier frequency (channel) during multiplexing mode. Nonetheless, spatial/directional characteristics may be incorporated even when different frequencies/channels are utilized. Each of the transceivers 410$_1$ and 410$_2$ may be configured, for example, with a different beamforming and/or antenna arrangement, to generate distinct particular directional beam patterns 512$_1$ and 512$_2$, respectively, which may enable communication of signals in a particular direction. Thus, the communication of data streams Data 1 and Data 2 may be performed with different antenna patterns, enabling the intended receiving devices to receive these different streams from different directions. For example, the directionality of the communication profiles of data streams Data 1 and Data 2 may be tailored for LOS communication—i.e., directed at the intended receiving device(s), and/or for communication through reflectors—i.e., directed at the particular reflector point(s) that would reflect the communication towards the intended receiving device(s). In this regard, configuring directionality of the transceivers for indirect communication (i.e., via reflectors) may comprise identifying and utilizing reflectors in the environment as multiplexing paths. The reflectors used for such operations may be specially positioned and/or may be randomly positioned existing reflectors. Reflectors may be specially manufactured and/or optimized, passive and/or active devices with good reflection characteristics. A user may acquire a number of these reflectors and mount them at different locations in the environment to improve network coverage within the environment.

In some embodiments of the invention, at least some of the communicated data streams may be intended for a single receiving device. For example, the data streams Data 1 and Data 2 may be intended for the same receiving end user device, with those data streams being used to carry different data (to increase the throughput) or carrying the same data (for enhancing reliability, such as through diversification). In other instances, however, the data streams communicated during a multiplexing mode of operation may be intended for different target receiving devices. For example, the data streams Data 1 and Data 2 may be intended for two different end devices. In this regard, the receiving devices may be configured (e.g., based on information provided by the device 400 (and NME) via the feedback or negotiation channel 240) to receive the correct/intended data streams. For example, when the transceivers 410$_1$ and 410$_2$ are configured to have distinct spatial profiles—i.e., with different beamforming patterns and/or directionality, and because the intended receiving devices are (likely) spatially separated, the intended receiving device for Data 1 may configure the beamforming of its receiver(s) based on the directionality of the transceiver 410$_1$, thus receiving stream Data 1. Similarly, intended receiving device for Data 1 may configure the beamforming of its receiver(s) based on the directionality of the transceiver 410$_2$, thus receiving stream Data 2. In such scenario, multiple-access is achieved by occupying only one RF channel while two streams of data (Data 1 and Data 2) are concurrently transmitted to two end devices. The application device 400 may search for and/or determine two directions (either LOS or through strong reflectors in the environment) that result in maximum orthogonality (e.g., minimum cross-interference or leakage) between the received streams at each receiver unit (least co-interference by the other stream).

In instances where cross-interference among different streams communicated during a multiplexing mode of operation is not completely eliminated (i.e., cross-interference is not zero), additional optimization measures may be incorporated and/or utilized to reduce the interference. For example, during a multiplexing mode of operation, spatial/directionality configuration of transceivers may be optimized to counter the presence of cross-interference, such as by controlling and/or adjusting configuration of beamforming and/or antenna arrangements based on Signal to Interference plus Noise Ratio (SINR) or Signal to Leakage plus Noise Ratio (SLNR) rather than Signal to Noise Ratio (SNR). In this regard, because SINR/SLNR based operations incorporate measurement or estimation of interference in the communication path, configuring the transceiver communication profile of the transceivers based on the SNIR and/or SLNR may enhance performance. For example, because SINR/SLNR is typically a function of RF frequency, selection and/or assignment of RF or frequency channels based on SINR/SLNR measurement (or estimation) may result in improved SINR for corresponding link(s). Thus, configurations that may be based on SINR/SLNR may maximize rejection/leakage between different streams.

In some embodiments of the invention, at least some of the data streams communicated during a multiplexing mode of operation (e.g., data streams Data 1 and Data 2) may correspond to coded versions of the same stream of information bits. For example, space-time coding (STC) (and/or channel coding schemes such as Turbo coding, LDPC coding) may be applied on the information bits to generate the data streams Data 1 and Data 2. Each of the data streams Data 1 and Data 2 may be transmitted over a different transceiver (transceivers $410_1$ and $410_2$, respectively), using distinct spatial profile (beam pattern/direction) and/or distinct frequency channels. At the receiving end, the intended receiving device may receive both streams Data 1 and Data 2 (possibly from two different directions), and may then apply space-time decoding schemes to recover the original information bits. The use of space-time encoding may enable the receiving device to efficiently recover the original information bits even though it may be receiving a superposition of streams Data 1 and Data 2 at the receiving side. In this case, in addition to improved effective received signal-to-noise-ratio (SNR), spatial/directional diversity may be achieved since the same information bits is communicated over two different links (different directions/reflectors).

Figure 5B:
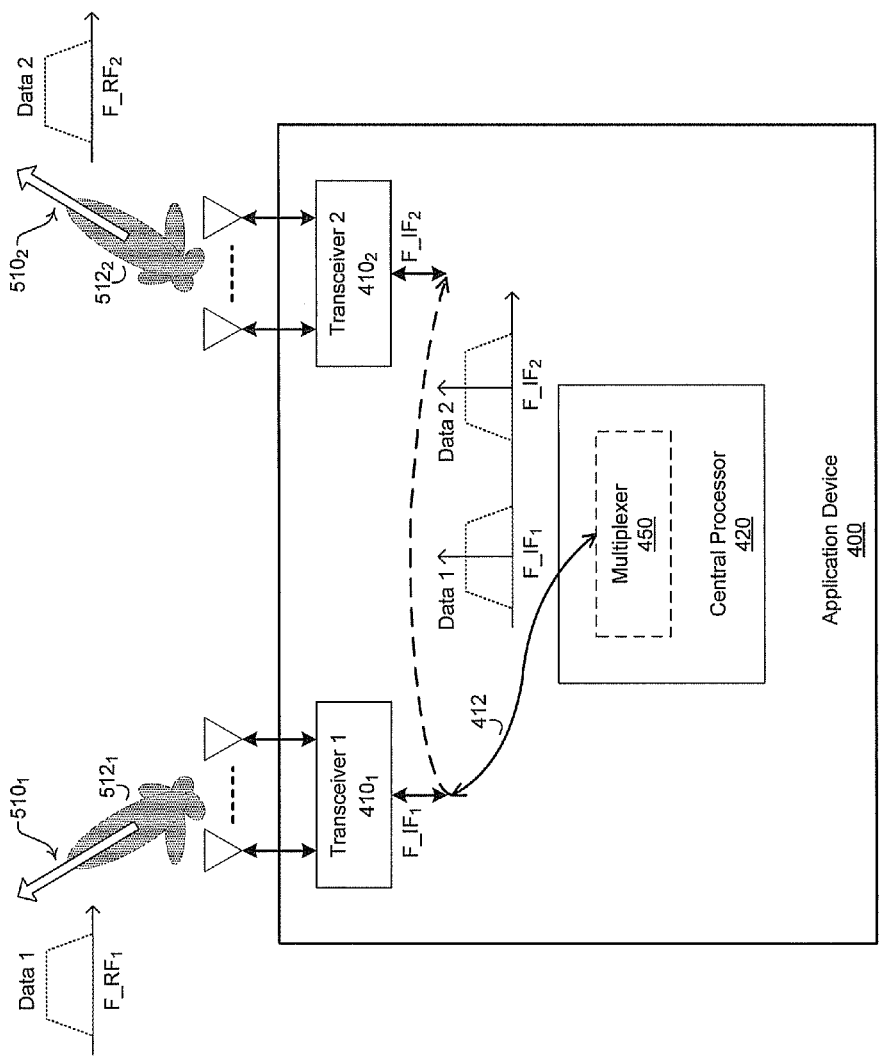
FIG. 5B is a diagram illustrating exemplary use of multiplexing during communication of multiple data streams by an application device with a collection of distributed transceivers that are implemented in a ring topology, in accordance with an embodiment of the invention.

FIG. 5B is a diagram illustrating exemplary use of multiplexing during communication of multiple data streams by an application device with a collection of distributed transceivers that are implemented in a ring topology, in accordance with an embodiment of the invention. Referring to FIG. 5B, there is shown the application device 400 of FIG. 4.

The application device 400 may be configured into a multiplexing mode of operation, whereby at least some of the distributed transceivers $410_1$-$410_N$ of the application device 400 may be configured and/or used to support communication of multiple streams from and/or to the application device 400. In some instances, the distributed transceivers $410_1$-$410_N$ may be connected to the central processor 420 using ring topology, wherein a single connection 412 may be utilized that connect the central processor 420 to the distributed transceivers $410_1$-$410_N$. In this regard, a single movable connector, for example, may be used to connect the central processor 420 to any particular one of the distributed transceivers $410_1$-$410_N$ at any given point, and that connector may then be moved to a different transceiver when needed. Accordingly, the central processor 420 may be configured to provide the data streams, one at a time, to each of the distributed transceivers $410_1$-$410_N$ being utilized for multiplexed communication.

In instances where the application device 400 implements a ring topology, the multiplexer 450 may implement time-division multiplexing when forwarding the data streams targeted for transmission to the intended transceivers, such as during a multiplexing mode of operation. In this regard, use of connection 412 may be subject to a time division access scheme, with different time slots being allocated for each data stream. The central processor 420 may receive two streams of data for transmittal (Data 1 and Data 2), and may generate, based on processing via the baseband processor 440 and up-converters 444, two corresponding $F\_IF_1$ and $F\_IF_2$ waveforms each carrying a different one of the data streams (Data 1 and Data 2, respectively). During time-slots allocated to stream Data 1, the connection 412 may be established with the transceiver $410_1$ (selected for communication of Data 1), and the $F\_IF_1$ waveform may then be forwarded to the transceiver $410_1$ for transmission. During time-slots allocated to stream Data 2, the connection 412 may be moved to the transceiver $410_2$ (selected for communication of Data 2), and the $F\_IF_2$ waveform (carrying bits corresponding Data 2) may then be forwarded to the transceiver $410_2$ for transmittal thereby.

Figure 6:
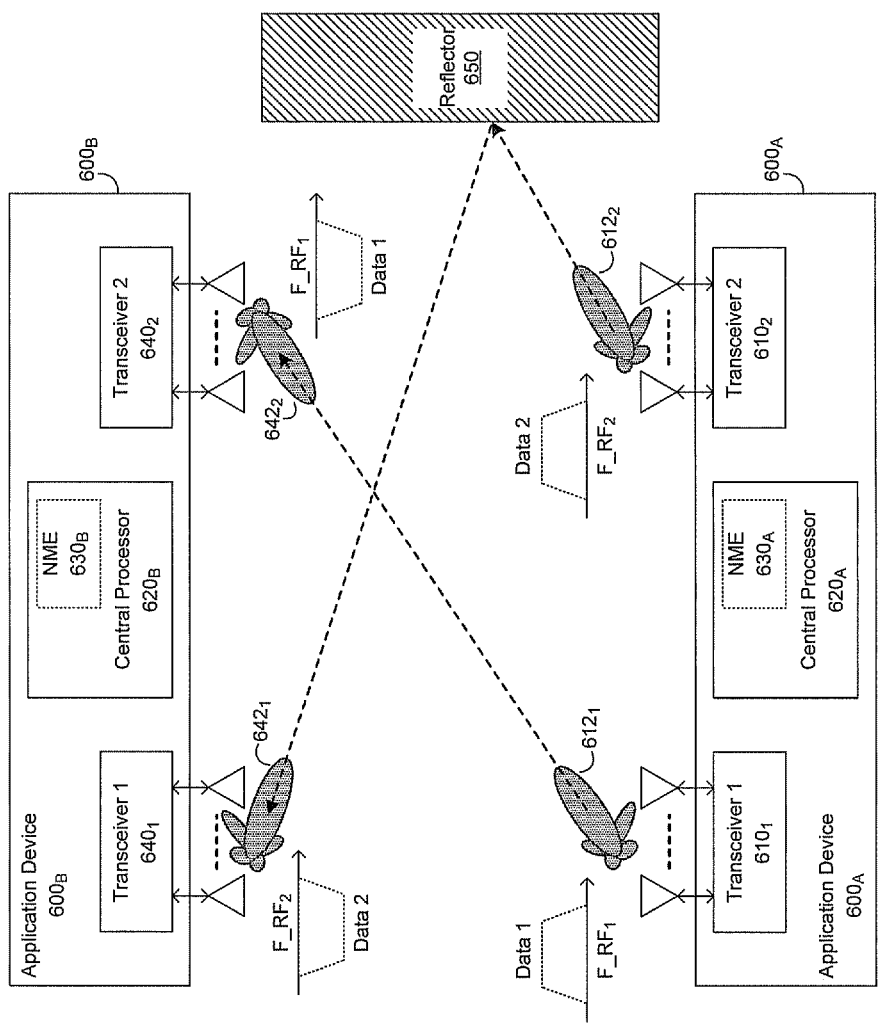
FIG. 6 is a diagram illustrating exemplary use of multiplexing during communication of multiple data streams to a single destination device, in accordance with an embodiment of the invention.

FIG. 6 is a diagram illustrating exemplary use of multiplexing during communication of multiple data streams to a single destination device, in accordance with an embodiment of the invention. Referring to FIG. 6, there are shown application devices $600_A$ and $600_B$, and a reflector 650.

Each of the application devices $600_A$ and $600_B$ may be substantially similar to the application device 400, as described with respect to FIGS. 4, 5A and 5B. In this regard, the application devices $600_A$ and $600_B$ may similarly support various modes of operation, including a multiplexing mode of operation.

Each of the application devices $600_A$ and $600_B$ may comprise, for example, a central processor ($620_A$ and $620_B$, respectively), which may be substantially similar to the central processor 420 of the application device 400. The central processors $620_A$ and $620_B$ may comprise corresponding network management engines (NMEs) $630_A$ and $630_B$, respectively, each of which may be substantially similar to the NME 430 of the Application device 400. In addition, each of the application devices $600_A$ and $600_B$ may comprise a plurality of the distributed transceivers (of which transceivers $610_1$ and $610_2$ in the application device $600_A$ and transceivers $640_1$ and $640_2$ in the application devices $600_B$ are shown), may be substantially similar to the distributed transceivers $410_1$-$410_N$ of the application device 400.

The reflector 650 may be similar to the reflector 230. In this regard, the reflector 650 may comprise a physical object that may be enabled to reflect signals that are incident in particular direction at a corresponding reflected angles or direction. The reflector 650 may be specially selected and/or positioned, and/or may be randomly positioned and existing in the environment.

In operation, the application devices $600_A$ and $600_B$ may be configured in a multiplexing mode of operation to enable communication of multiple data streams by each of the devices. This may enhance communication between the devices, by allowing for increased throughput and/or improved reliability. In this regard, increased throughput may result from communicating different parts of the data via the multiple streams and improved reliability may result from redundant communication of the same data in the multiple steams.

For example, during a multiplexing mode of operation, the application devices $600_A$ and $600_B$ may be able to communicate (e.g., concurrently) two data streams (Data 1 and Data 2). In this regard, each of the application devices $600_A$ and $600_B$ may configure two different transceivers (e.g., the transceivers $610_1$ and $610_2$ in the application device $600_A$ and the transceivers $640_1$ and $640_2$ in the application devices $600_B$) for communicating the two streams Data 1 and Data 2. The utilized transceivers may be configured with distinct communication profiles, to enable communication of particular data streams, without interfering with the other communication links. For example, during communication from application device $600_A$ to application device $600_B$, the two transmitting transceivers of the application device $600_A$ (the transmitting side) may be configured to utilize different directions and/or beamforming patterns—e.g., the transceiver $610_1$ may be configured to utilize beamforming pattern $612_1$ tailored for LOS communication, and the transceiver $610_2$ may be configured to utilize beamforming pattern $612_2$ tailored for reflection based communication via reflector 650.

On the receiving side, the two receiving transceivers of the application device $600_B$ may be configured to utilize different beamforming patterns/directions, based on beamforming of the corresponding transmitting transceivers. For example, the transceiver $640_2$ may be configured to utilize beamforming pattern $642_1$ tailored for LOS communication towards the corresponding transmitting transceiver $610_1$—i.e., having its beam formed in the direction of the transmitting transceiver $610_1$. The transceiver $640_1$ may be configured to utilize beamforming pattern $642_1$, which is tailored for reflection based communication, via the reflector 650—i.e., having its beam formed in the anticipated direction of the reflection, from the reflector 650, of signals of the transmitting transceiver $610_2$.

In some embodiments of the invention, such antenna-pattern or spatial multiplexing between two devices may be achieved by occupying only one RF channel for all of the data streams (e.g., for both streams Data 1 and Data 2) that are communicated between the two devices. Thus, the spatial multiplexing may increase the throughput (e.g., double the throughput when two streams are used) without requiring additional usage of the frequency/channel spectrum.

Determining and/or setting the various settings associated for the multiplexing modes, and/or the utilized transceivers, may be based on communication environmental information, which may be collected by the NMEs $630_A$ and $630_B$. Furthermore, the NMEs $630_A$ and $630_B$ may exchange information (e.g., via a dedicated control channel, similar to the feedback or negotiation channel 240), which may be utilized by the respective application devices during multiplexing operations.

Figure 7A:
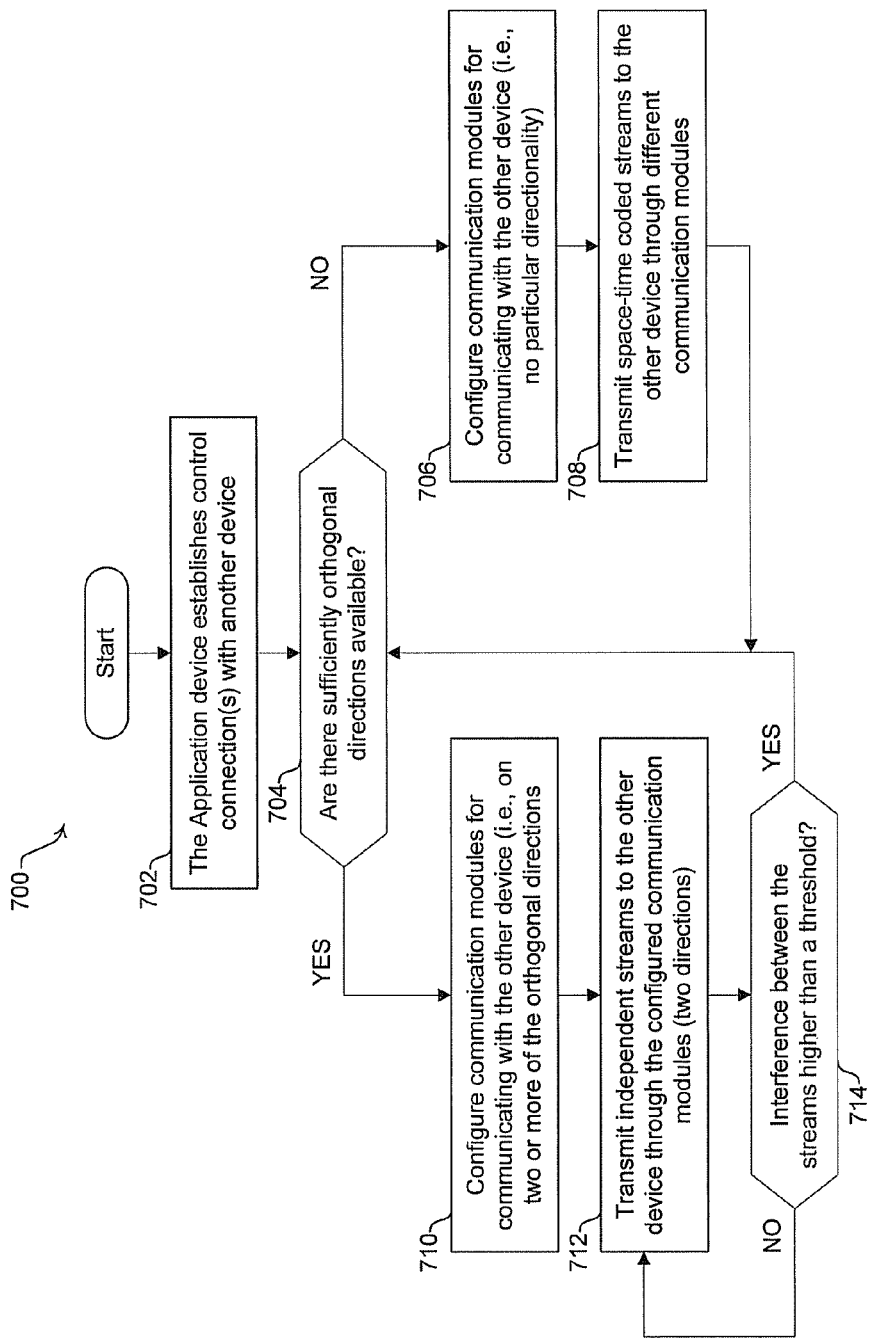
FIG. 7A is a flow chart that illustrates exemplary steps for dynamic configuration of multiplexing mode of operation when communicating with a single target device, in accordance with an embodiment of the invention.

FIG. 7A is a flow chart that illustrates exemplary steps for dynamic configuration of a multiplexing mode of operation when communicating with a single target device, in accordance with an embodiment of the invention. Referring to FIG. 7A, there is shown a flow chart 700 comprising a plurality of exemplary steps for multiplexing a plurality of data streams communicated to a single target device.

In step 702, an application device, such as the application device ($600_A$), may establish control connection(s) with the target device ($600_B$). For example, the application device may establish with the target device, a low-throughput high-fidelity channel (e.g., channel 240), which may be utilized to coordinate communications between the application devices. In this regard, the control connections may be utilized for communicating and negotiating system configurations used for high-throughput links. In step 704, the application device may determine whether there are sufficiently orthogonal directions available between the devices.

In instances where it may be determined that there are no sufficiently orthogonal directions available, the process may proceed to step 706. In step 706, the application device may configure one or more communication modules for communicating with the other device. In this regard, the communication modules may be configured to enable communicating multiple data streams by means other than directionality. This may be achieved by configuring each of the communication modules based on different and/or distinct communication protocol(s), connection type(s), and/or frequency (or frequency channel). In this regard, the NME may choose the best subset of transceivers that may provide the required number of data streams (and throughout), with lowest total transmit power or total power consumption. Alternatively, and to conserve frequency spectrum usage, the communication modules may instead enable multiplexing of the data streams while using the same frequency (channel) without directionality. For example, the data may be communicated via multiple-input-multiple-output (MIMO) and/or space-time-coding streams. In step 708, a plurality of data streams may be multiplexed using the configured communication modules, whereby independent streams may be transmitted from one device to the other device through different communication modules. The process may then jump back to stop 704.

Returning to step 704, in instances where it may be determined that there are sufficiently orthogonal directions available; the process may proceed to step 710. In step 710, the application device may configure a plurality of communication modules for communicating with the other device (i.e., on two or more of the orthogonal directions). In step 712, a plurality of data streams may be multiplexed using the configured communication modules, whereby independent streams may be transmitted (e.g., in different directions) between the devices. In step 714, it may be determined whether any existing interference between the streams exceeds a particular threshold. In this regard, the interference threshold may be configurable, user dependent, and/or may be based on communication environment information (as collected by the network management engines) and characteristics of data streams (modulation, constellation, coding gain, data rate). In instances where it may be determined that any existing interference does not exceed the threshold, the process may loop back to step 712; otherwise, the process may jump back to stop 704.

Figure 7B:
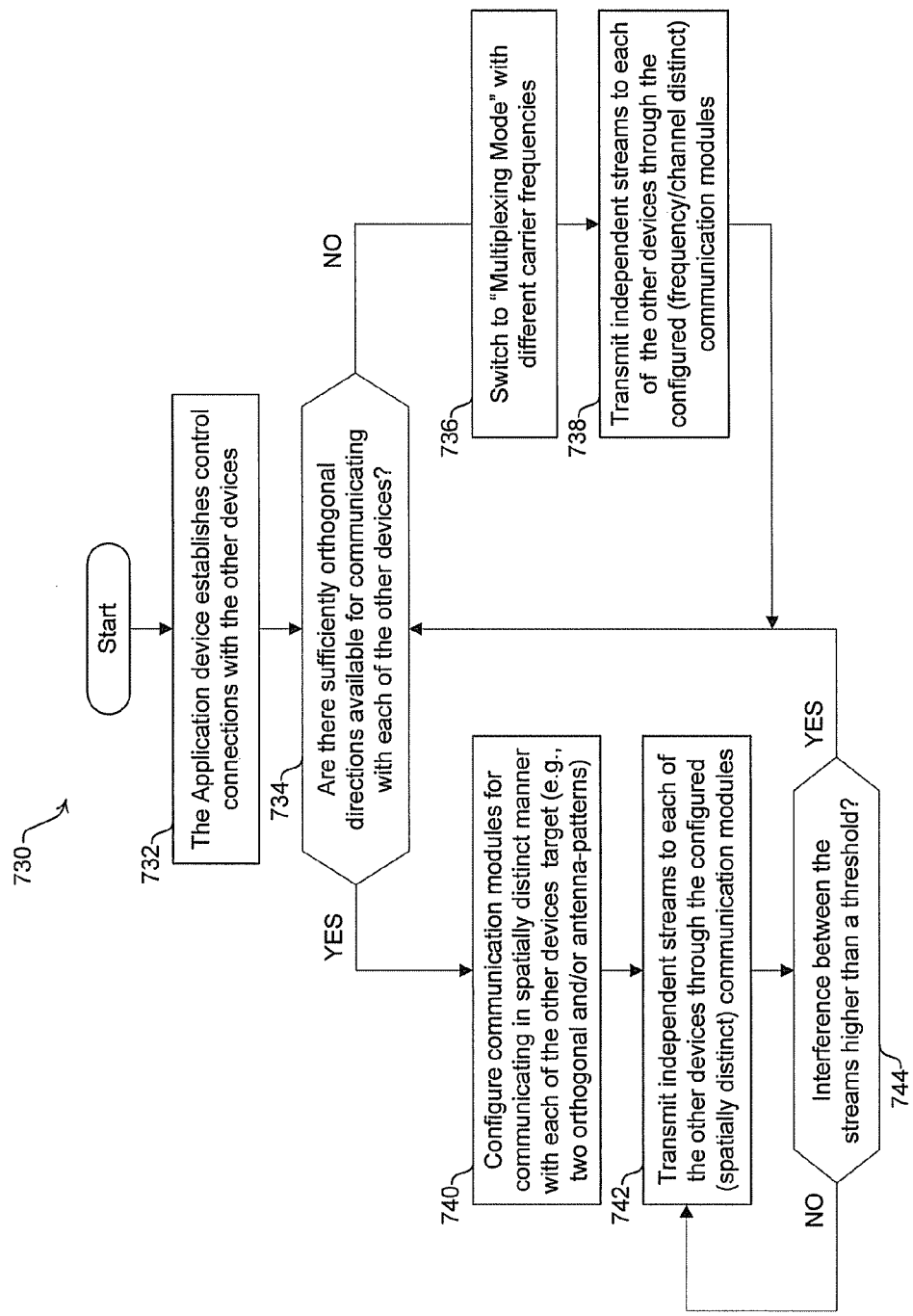
FIG. 7B is a flow chart that illustrates exemplary steps for dynamic configuration of multiplexing mode of operation when communicating with multiple target devices, in accordance with an embodiment of the invention.

FIG. 7B is a flow chart that illustrates exemplary steps for dynamic configuration of a multiplexing mode of operation when communicating with multiple target devices, in accordance with an embodiment of the invention. Referring to FIG. 7B, there is shown a flow chart 730 comprising a plurality of exemplary steps for multiplexing a plurality of data streams communicated to multiple target device.

In step 732, an application device, such as the application device 400, may establish control connection(s) with one or more target devices. For example, the application device 400 may establish with the target devices low-throughput high-fidelity channels (e.g., similar to the channel 240), which may be utilized to coordinate communications between the application device 400 and the target devices. In this regard, the control connections may be utilized for communicating and negotiating system configurations used for high-throughput links. In step 734, the application device may determine if there are sufficiently orthogonal directions available between the application device 400 and each of the target devices.

In instances where it may be determined that there are no sufficiently orthogonal directions available, the process may proceed to step 736. In step 736, the application device may configure one or more communication modules for communicating with each of the target devices. In this regard, the communication modules may be configured to enable communication of the data streams by means other than directionality (not available). This may be achieved by utilizing for each of the communication modules, different and/or distinct communication protocol(s), connection type(s), and/or frequency (or frequency channel). In step 738, a plurality of data streams may be multiplexed using the configured communication modules, whereby independent streams may be transmitted from one device to the other device through the configured communication modules. The process may then jump back to stop 734.

Returning to step 734, in instances where it may be determined that there are sufficiently orthogonal directions available, the process may proceed to step 740. In step 740, the application device may configure a plurality of communication modules for communicating with the target devices (i.e., using two or more of the available orthogonal directions). In step 742, a plurality of data streams communicated to the target devices may be multiplexed using the configured communication modules, whereby independent streams that are spatially distinct may be transmitted (in different directions) between the application device and the target devices. In step 744, it may be determined whether any existing interference between the streams exceeds the applicable interference threshold. In instances where it may be determined that any existing interference does not exceed the threshold, the process may loop back to step 742; otherwise, the process may jump back to stop 734.

Various embodiments of the invention may comprise a method and system for utilizing multiplexing to increase throughput in a network of distributed transceivers with array processing. The application device 400 may be configured into a multiplexing mode of operation. In this regard, configuring the application device 400 for the multiplexing mode of operation may comprise adaptively and/or dynamically configuring one or more communication modules, from one or more of the plurality of distributed transceivers $410_1$-$410_N$, with each of the communication modules comprising one or more antennas and/or antenna array elements, and at least one of that distributed transceivers $410_1$-$410_N$ which may be associated with the one or more antenna(s) and/or antenna array element(s). The communication modules may be utilized to multiplex communication of data streams from and/or to the application device 400. In some instances, at least some of the communicated data streams may comprise the same data—i.e., for redundant communication of the same data stream.

Also, in some instances, at least some of the communicated data streams may be directed to the same destination device. In some instances, at least some of the communication modules may be configured to have distinct spatial communication profiles. In this regard, creating the distinct spatial communication profiles may comprise configuring particular and/or distinct beamforming settings and/or antenna arrangement for each of the communication modules. In some instances, one or more of the communication modules may be configured to have a distinct frequency or channel.

The application device 400 may continuously monitor and/or collect, using the network management engine 430 for example, communication related information, such as propagation environment conditions, link quality, device capabilities, locations, target throughput, and/or application QoS requirements. The application device 400 may then adaptively and/or dynamically configure (or reconfigure) multiplexing related operations and/or functions, and/or communication operations based thereon, based on the collected communication related information. In some instances, the application device 400 may configure, based on a location of one or more reflectors (e.g., reflector 230), beamforming settings and/or antenna arrangement for at least some communication modules. Furthermore, the application device 400 may select, such as based on collected communication related information, connection types and/or communication protocols that may be utilized for establishing one or more links via the communication modules, for communicating the data streams. The application device 400 may allocate communication resources (e.g., up-convertors 442, down-convertors 444, and/or memory 460) to the communication modules for use during the communication of the data streams. At least some of the allocated resources may be shared among the communication modules.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing multiplexing to increase throughput in a network of distributed transceivers with array processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of communication between a first device and a second device, the first device comprising a plurality of distributed transceivers, each distributed transceiver comprising one or more corresponding antenna arrays, the method comprising:
   identifying (i) a set of reflectors in a propagation environment between the first and second devices and (ii) a set of antenna patterns that result in cross-interference at the second device to be reduced below a programmable threshold;
   configuring a set of distributed transceivers in the plurality of distributed transceivers to associate each distributed transceiver in the set of distributed transceivers with an identified reflector to transmit a data stream to the second device using the distributed transceiver and the associated reflector, wherein:
      said configuration is based on a spatial multiplexing mode that utilizes a same frequency for each distributed transceiver; and
      each of said set of distributed transceivers controls communication via said one or more corresponding antenna arrays utilizing one or more of said identified set of antenna patterns; and
   multiplexing a plurality of data streams between the first and second devices via said configured set of transceivers and the corresponding antenna arrays.

2. The method according to claim 1, further comprising configuring said set of transceivers to have distinct spatial communication profiles.

3. The method according to claim 2, further comprising configuring beamforming settings and an antenna arrangement for each antenna array to achieve said distinct spatial communication profiles.

4. The method according to claim 2, further comprising multiplexing at least some of said data streams using two or more of said set of transceivers to have distinct spatial communication profiles.

5. The method according to claim 1, further comprising configuring one or more of said plurality of transceivers to have a distinct frequency or channel.

6. The method according to claim 5, further comprising multiplexing at least some of said data streams using two or more of said set of transceivers to have distinct frequencies or channels.

7. The method according to claim 1, wherein the first device further comprises a network management engine, the method further comprising monitoring and tracking, by said network management engine, communication related information that affects said configuration of said set of transceivers and said multiplexing of said plurality of data streams.

8. The method according to claim 7, further comprising determining based on said monitoring and tracking, connection types and communication protocols that are utilized for establishing one or more links via said set of transceivers for performing said transmission of said data streams.

9. The method according to claim 1, further comprising allocating baseband processors to the first and second devices for use during said multiplexing of said data streams, wherein at least some of said baseband processors are shared among said plurality of transceivers.

10. The method of claim 1 further comprising:
determining that a position of one or more of the identified reflectors has changed in relation to positions of the first and second device; and
modifying a configuration of the plurality of distributed transceivers to change said antenna patterns based on the determination.

11. The method of claim 1, wherein identifying the set of reflectors and the set of antenna patterns comprises:
scanning the propagation environment between the first and second devices to identify said set of reflectors; and
adjusting said antenna patterns to reduce said cross-interference at the second device to below said programmable threshold.

12. The method of claim 11 further comprising:
scanning the propagation environment between the first and second devices to identify whether positions of the identified reflectors have changed in relation to positions of the first and second devices; and
modifying a configuration of the plurality of distributed transceivers to change said antenna patterns based on the positions of the reflectors in relation to the position of the first and second devices.

13. The method of claim 1, wherein each of said set of distributed transceivers further controls communication via said one or more of the corresponding antenna arrays by utilizing a set of antenna directions that results in cross-interference at the second device to be reduced below the programmable threshold.

14. The method of claim 1, wherein said plurality of data streams communicated between the first and second device are independent of each other.

15. The method of claim 1, wherein said multiplexing of data streams further comprises multiplexing at least two data streams with coded versions of a same stream of data bits.

16. The method of claim 15 further comprising:
at the first device, applying space-time coding of data bits to generate said at least two data streams; and
at the second device, applying space-time decoding to recover the space-time coded data bits.

17. The method of claim 16, wherein applying space-time decoding at the second device results in said recovery of the space-time coded data bits even though the second device is receiving a superposition of a plurality of data streams.

18. A system, comprising:
a first device that comprises a plurality of distributed transceivers, each distributed transceiver comprising one or more corresponding antenna arrays; and
a second device,
wherein the first device is configured to:
identify (i) a set of reflectors in a propagation environment between the first and second devices and (ii) a set of antenna patterns that result in cross-interference at the second device to be reduced below a programmable threshold;
configure a set of distributed transceivers in the plurality of distributed transceivers to associate each distributed transceiver in the set of distributed transceivers with an identified reflector to transmit a data stream to the second device using the distributed transceiver and the associated reflector, wherein:
said configuration is based on a spatial multiplexing mode that utilizes a same frequency for each distributed transceiver; and
each of said set of distributed transceivers controls communication via said one or more corresponding antenna arrays utilizing one or more of said identified set of antenna patterns; and
multiplex a plurality of data streams between the first and second devices via said configured set of transceivers and the corresponding antenna arrays.

19. The system according to claim 18, wherein the first device further comprises a central processor operable to configure said set of transceivers to have distinct spatial communication profiles.

20. The system according to claim 19, wherein said central processor is further operable to configure beamforming settings and an antenna arrangement for each antenna array to achieve said distinct spatial communication profiles.

21. The system according to claim 19, wherein said first device is further configured to multiplex at least some of said data streams using two or more of said set of transceivers to have distinct spatial communication profiles.

22. The system according to claim 19, wherein said central processor is further operable to configure one or more of said plurality of transceivers to have a distinct frequency or channel.

23. The system according to claim 22, wherein said first device is further configured to multiplex at least some of said data streams using two or more of said set of transceivers to have distinct frequencies or channels.

24. The system according to claim 18, wherein the first device further comprises a network management engine operable to monitor and track communication related information that affects said configuration of said one or more of said set of transceivers and said multiplexing of said plurality of data streams.

25. The system according to claim 24, wherein the first device further comprises a central processor operable to determine based on said monitoring and tracking, connection types and communication protocols that are utilized for establishing one or more links via said set of transceivers for performing said transmission of said data streams.

26. The system according to claim 25, wherein said first device is operable to allocate baseband processors to the first and second devices for use during said multiplexing of said data streams, wherein at least some of said baseband processors are shared among said plurality of transceivers.

27. The system of claim 18, wherein the first device is further configured to:
   determine that a position of one or more of the identified reflectors has changed in relation to positions of the first and second device; and
   modify a configuration of the plurality of distributed transceivers to change said antenna patterns based on the determination.

28. The system of claim 18, wherein identifying the set of reflectors and the set of antenna patterns comprises:
   scanning the propagation environment between the first and second devices to identify said set of reflectors; and
   adjusting said antenna patterns to reduce said cross-interference at the second device to below said programmable threshold.

29. The system of claim 28, wherein the first device is further configured to:
   scan the propagation environment between the first and second devices to identify whether positions of the identified reflectors have changed in relation to positions of the first and second devices; and
   modify a configuration of the plurality of distributed transceivers to change said antenna patterns based on the positions of the reflectors in relation to the position of the first and second devices.

30. The system of claim 18, wherein each of said set of distributed transceivers further controls communication via said one or more of the corresponding antenna arrays by utilizing a set of antenna directions that results in said cross-interference at the second device to be reduced below the programmable threshold.

31. The system of claim 18, wherein said plurality of data streams communicated between the first and second device are independent of each other.

32. The system of claim 18, wherein said multiplexing of data streams further comprises multiplexing at least two data streams with coded versions of a same stream of data bits.

33. The system of claim 32, wherein the first device is further configured to apply space-time coding of data bits to generate said at least two data streams, wherein the second device is configured to apply space-time decoding to recover the space-time coded data bits.

34. The system of claim 33, wherein applying space-time decoding at the second device results in said recovery of the space-time coded data bits even though the second device is receiving a superposition of a plurality of data streams.

\* \* \* \* \*